April 19, 1927.

C. N. WAGENSELLER

FAUCET

Filed Oct. 27, 1924

1,625,404

Inventor
Charles N. Wagenseller
By Cushman, Bryant & Darby
Attorneys

Patented Apr. 19, 1927.

1,625,404

UNITED STATES PATENT OFFICE.

CHARLES N. WAGENSELLER, OF DECATUR, ILLINOIS, ASSIGNOR TO ADOLPH MUELLER, TRUSTEE, OF DECATUR, ILLINOIS.

FAUCET.

Application filed October 27, 1924. Serial No. 746,074.

The present invention relates to improvements in basin faucets and similar plumbing fixtures.

In securing such faucets to a slab or basin, it is customary to interpose between the body of the faucet and the slab or basin a rubber gasket which surrounds the stem of the fixture that extends through a suitable opening in the support, for the purpose of making a water-tight joint. The openings in the supporting slabs or basin members are necessarily somewhat larger than the stem or shanks of the faucet fixtures passed therethrough and the latter are secured in position by suitable nuts and washers engaging the opposite face of the supporting member from that on which the body of the faucet bears. Considerable skill and time are required to enable a plumber to accurately position the gaskets which, as aforesaid, are commonly interposed between the body of the faucet and the supporting member in order that the gasket may be properly centered with relation to the axis of the faucet stem or shank and not project beyond any portion of the flange on the body which is adjacent the support.

The object of the present invention is to provide a faucet which, as furnished by the factory, will have the sealing gasket referred to permanently connected therewith so that the article may be more expeditiously applied than those heretofore employed, and in which no special attention will be required to see that the sealing gasket is properly related to the other parts of the fixture.

Figure 1:
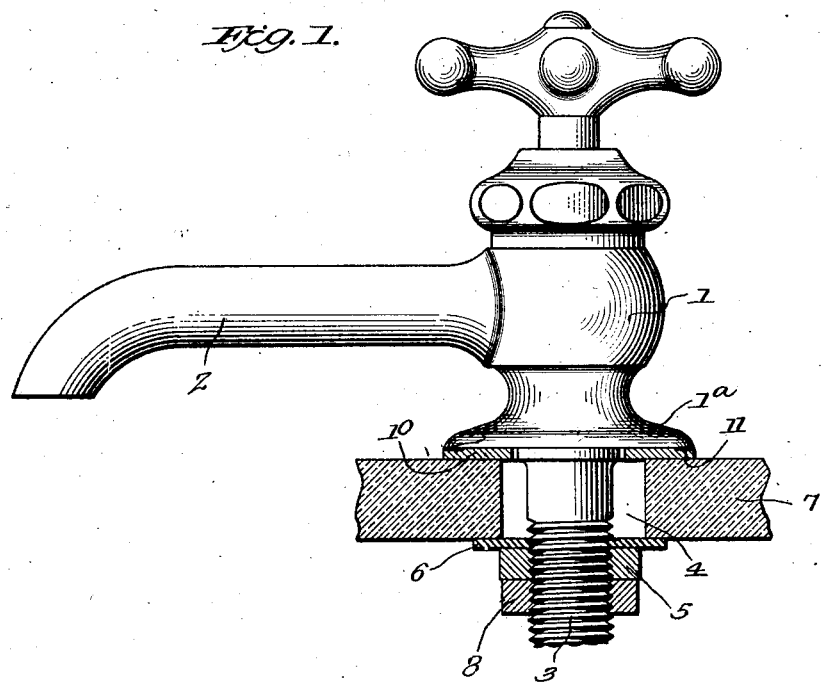
Figure 1 is an elevation of a faucet having the present improvements applied thereto, a portion of the base or body of the fixture being broken away, and a means for securing it to a supporting slab or basin being illustrated.
Figure 2:
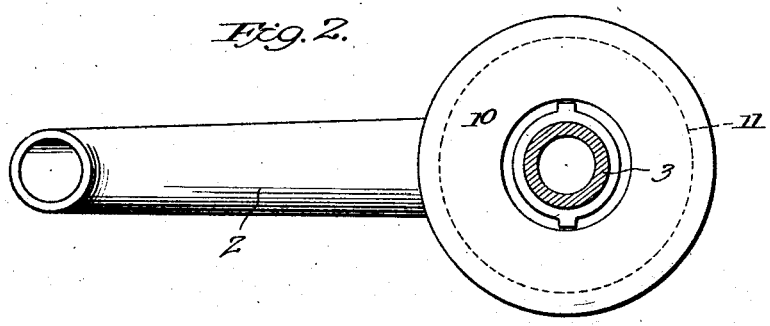
Figure 2 is a bottom plan of the faucet detached from the supporting slab.

Referring to the drawings, 1 designates the body of a basin faucet or similar fixture, which is provided with a suitable discharge spout 2 and with the usual externally threaded tubular stem or shank 3.

In mounting the fixture the stem or shank 3 is passed through a suitable aperture 4 provided in the slab or basin to which the faucet is to be connected and the fixture is secured in position by a nut 5 engaging the threads on the stem or shank. If desired, a washer 6 may be interposed between the rear or lower face of the supporting member 7, and a lock nut 8 may also be provided for holding the fixture firmly in place. The parts before referred to are such as are commonly employed, and the illustration thereof in the drawing is, therefore, more or less conventional.

As above stated, it is customary to arrange a gasket 10 of rubber or similar material between the base flange 1ª of the faucet fixture, and the outer face of the supporting member 7. Unless considerable care is exercised by the plumber, the gasket 10 will not be properly centered with respect to the axis of the shank or stem 3 and the opening 4 in the supporting member 7, and frequently considerable time is required to position the several parts in the desired relation and maintain them in such position while the nut 5 is manipulated to secure the faucet to its support.

According to the present invention the gasket 10 is permanently connected with the faucet body at the factory, as by means of glue or other suitable adhesive, as indicated at 11. Preferably, as shown, the adhesive connecting means is in the form of a relatively narrow band positioned adjacent the periphery of the gasket 10, although some of the advantages of the present invention would be accomplished if the entire upper or outer surface of the gasket were coated with the adhesive.

By making the adhesive connection between the gasket 10 and faucet body relatively narrow, the freedom of the gasket to expand radially inward as the nut 5 is tightened about the stem or shank 3 of the faucet fixture and the ability of the gasket to conform to any slight irregularities in the surface of the support 7 against which it is applied are not interfered with.

It is believed that the advantages of having the sealing gasket 10 initially and permanently connected to the faucet body will be readily appreciated.

The gasket can be properly and accurately applied to the base flange of the fixture and the time of the plumber required to secure the faucet in position materially reduced.

As the gasket is permanently connected at its outer edge to the fixture, any displacement thereof, due to compression in tightening the nut 5 will be radially inward, thus avoiding any possibility of portions of the gasket being forced outward beyond the flange 1ª of the fixture requiring subsequent trimming, as is frequently required with the ordinary, initially loose, gaskets.

Having thus described the invention, what is claimed is:—

1. A faucet having a stem or shank, adapted to pass through an opening in a suitable support, a gasket surrounding the stem or shank, the aperture in the gasket being of greater area than the portion of the shank or stem extending therethrough, and means located at the periphery of the gasket permanently connecting the gasket to the face of the faucet body and preventing outward radial expansion of the gasket as it is compressed by securing the faucet in position on a support.

2. A faucet having a stem or shank adapted to pass through an opening in a suitable support and a gasket surrounding said stem, the area of the aperture in the gasket being greater than that of the portion of the shank or stem which passes therethrough, and an adhesive band positioned adjacent the periphery of the gasket and securing the gasket to the faucet body.

In testimony whereof I have hereunto set my hand.

CHARLES N. WAGENSELLER.